(12) United States Patent
Mei et al.

(10) Patent No.: US 7,961,270 B2
(45) Date of Patent: Jun. 14, 2011

(54) DISPLAY DEVICE WITH LOW SCRATCH VISIBILITY AND MANUFACTURING METHOD THEREOF

(75) Inventors: Kuang-Hua Mei, Hsin-Chu (TW);
Shih-Ping Lin, Hsin-Chu (TW);
Po-Hung Chen, Hsin-Chu (TW)

(73) Assignee: AU Optronics Corporation, Hsin-Chu (TW)

( * ) Notice: Subject to any disclaimer, the term of this patent is extended or adjusted under 35 U.S.C. 154(b) by 168 days.

(21) Appl. No.: 12/544,813

(22) Filed: Aug. 20, 2009

(65) Prior Publication Data
US 2010/0066944 A1    Mar. 18, 2010

(30) Foreign Application Priority Data

Sep. 15, 2008 (TW) .............................. 97135398 A

(51) Int. Cl.
G02F 1/1335 (2006.01)
G09F 13/04 (2006.01)
H01L 21/00 (2006.01)

(52) U.S. Cl. .............. 349/64; 349/65; 349/96; 349/112; 349/187; 362/97.3; 438/30

(58) Field of Classification Search .................... 349/57, 349/61, 62, 64–65, 96, 112, 187; 362/97.1–97.4; 445/24; 438/30
See application file for complete search history.

(56) References Cited

U.S. PATENT DOCUMENTS

| | | | |
|---|---|---|---|
| 6,480,248 B1 * | 11/2002 | Lee et al. | 349/96 |
| 2009/0167981 A1 * | 7/2009 | Arai et al. | 349/62 |

* cited by examiner

*Primary Examiner* — Brian M. Healy
*Assistant Examiner* — Michael P Mooney
(74) *Attorney, Agent, or Firm* — Thomas, Kayden, Horstemeyer & Risley, LLP

(57) ABSTRACT

A display device and a manufacturing method thereof are provided. The display device includes a light guide, a light source, and a brightness enhancement film (BEF), and a dual brightness enhancement film (DBEF). The light guide has a first edge along a first direction and a second edge adjacent to the first edge corresponding to the light source. The BEF is disposed on the light guide and has a plurality of prisms along a second direction which rotates from 0 to 90 degrees with respect to the first direction. The DBEF has a transmission axis along a third direction which also rotates from 0 to 90 degrees with respect to the first direction.

20 Claims, 15 Drawing Sheets

DISPLAY DEVICE WITH LOW SCRATCH VISIBILITY AND MANUFACTURING METHOD THEREOF

This application claims the priority based on a Taiwanese Patent Application No. 097135398, filed on Sep. 15, 2008, the disclosure of which is incorporated herein by reference in its entirety.

BACKGROUND OF THE INVENTION

1. Field of the Invention

This invention relates to a display device and a manufacturing method thereof; more particularly, this invention relates to a display device that can reduce the visibility of scratches thereon and a manufacturing method thereof.

2. Description of the Prior Art

Liquid crystal displays (LCDs) have been widely used in all kinds of electronic products, such as LCD televisions, computers, mobile phones, and personal digital assistants (PDA). LCDs have the advantages of light weight, low power consumption, and low radiation. Moreover, because the sizes of LCDs can be relatively larger and the product specifications are largely improved, the variety of applications in the market continuously increases. However, because the liquid crystal material in the LCDs does not emit light, backlight modules are required to provide light source to achieve the display effect. Therefore, backlight modules are indeed one of the most important parts of LCDs. As the difference in panel size increases and the application field diverges, it is predictable that the backlight module industry is going to be further developed. Especially, because the demand on LCDs has largely increased recently, the design of backlight module for LCD devices has become diverse to meet the function and exterior appearance requirements of the LCD devices.

As illustrated by FIG. 1A, a conventional LCD device include a light guide 13, a light source 15, a brightness enhancement film (BEF) 31, a dual brightness enhancement film (DBEF) 33, and a display panel 20. The light source 15 is disposed corresponding to the edge of the light guide 13 to emit light into the light guide 13. After the light is transmitted by the light guide 13, the light goes upwards into the BEF 31. Prisms 37 are disposed on the BEF 31 which can recycle the light with large incident angles to concentrate the light and enhance brightness. The light then enters the DBEF 33. The DBEF 33 having a transmission axis 35 allows the polarization light in the direction of the transmission axis 35 to pass through and recycles the polarization light that is not in the direction of the transmission axis 35. In the conventional design, the transmission axes 35 are generally designed to be perpendicular to the disposing direction of the prisms 37. On the other hand, the transmission axis 35 is parallel to the transmission axis of lower polarizer (not shown) of the display panel 20. In NB or desktop products the transmission axis 35 is often designed a bias degree $\beta_1$ to be 135° as shown in FIG. 1A. The prism 37 is often put in a bias degree $\beta_2$ from 0° to 45° for the design has higher brightness than the case that prism is put in a bias from 135° to 180°. Therefore, in the cases where the prism 37 is put in a bias degree 45° as shown in FIG. 1A, the transmission axes 35 are perpendicular to the disposing direction of the prisms 37. The light that passes through finally reaches the display panel 20 to facilitate image display of the display panel 20.

The brightness performance of the conventional LCD device varies with the viewing direction (i.e. azimuth angle) and the viewing angle. The viewing angle refers to the angle of the observer deviates from the central axis of the panel. As illustrated by FIG. 1B, from the observation direction of the azimuth angle 30°-210°, the brightness of LCD decreases from the central viewing angle 0° to viewing angles of 20°, 40°, 60°, etc. However, from the observation direction of the azimuth angle 120°-300°, as shown in FIG. 1C, the brightness (vertical axis) of LCD gradually decreases from 200 to about 50 as the viewing angle (horizontal axis) shifts from the center (0°) to the viewing angles of 20°, 40°, 60°, 90°, etc. Furthermore, as shown in FIG. 1C, as the viewing angle exceeds 60°, the brightness significantly increases and then decreases to form another brightness peak value 90 at the viewing angle of about 70°.

Because the DBEF 33 has a lower hardness, the DBEF is readily scratched during the manufacture process. As illustrated by the dotted line in FIG. 1C, the brightness of light that passes through the scratched part gradually decreases as the viewing angle increases. Because the overall brightness distribution curve illustrated by the solid line shows that a significant increase of brightness occurs at larger viewing angle when no scratch occurs, the increased brightness exceeds the brightness distribution when scratches occur which is illustrated by the dotted line. Therefore, the overall optical performance of the scratched part is different from that of the unscratched part, such that users can notice the existence of scratches when viewing the LCD device.

SUMMARY OF THE INVENTION

An object of this invention is to provide a display device and a manufacturing method thereof to reduce the visibility of the scratches on DBEFs.

Another object of this invention is to provide a display device and a manufacturing method thereof to improve the overall performance of images.

A display device includes a backlight module and a display panel disposed on the backlight module. The backlight module includes a light guide, a light source, and a plurality of optical films. The light guide has a first edge extending along a first direction and a second edge adjacent to the first edge. The light source is disposed adjacent to the second edge. The optical films include a first brightness enhancement film (BEF) and a dual brightness enhancement film (DBEF) overlapping with each other. The first BEF is disposed on the light guide, and a plurality of prisms are parallelly arranged thereon. The prisms are disposed along a second direction, wherein the second direction rotates counterclockwise a first angle from 0° to 90° with respect to the first direction. The DBEF is disposed on the first BEF and has a transmission axis. The transmission axis extends along a third direction, wherein the third direction rotates counterclockwise a second angle from 40° to 50° with respect to the first direction. In a preferred embodiment, the second angle should be around 45°.

By arranging the disposing direction of the prisms on the first BEF and the direction of the transmission axis as described above, the brightness increment effect at larger angle can be reduced. Because the brightness peak value is reduced at larger angle, the overall distribution curve can approximate to the brightness distribution curve of the scratched part. Therefore, the overall optical performance of the scratched part is similar to that of the unscratched part, such that users are less likely to notice the existence of scratches.

The manufacturing method of the display device includes the following steps: providing a light guide, which can be sequentially divided counterclockwise into a first quadrant, a second quadrant, a third quadrant, and a fourth quadrant;

providing a light source adjacent to the third quadrant and the fourth quadrant of the light guide; disposing a first brightness enhancement film on the light guide, so that prisms disposed thereon extend along the direction passing the second quadrant and the fourth quadrant; disposing a dual brightness enhancement film on the brightness enhancement film, so that a transmission axis thereof extends along the direction passing the second quadrant and the fourth quadrant; and disposing a display panel on the dual brightness enhancement film.

DETAILED DESCRIPTION OF THE PREFERRED EMBODIMENT

The present invention relates to a display device. In a preferred embodiment, the display device of this invention is a liquid crystal display device including home LCD televisions, LCD monitors of personal computers and laptop computers, LCD screens of mobile phones and digital cameras, and LCD devices used in other electronic products.

Figure 1A:
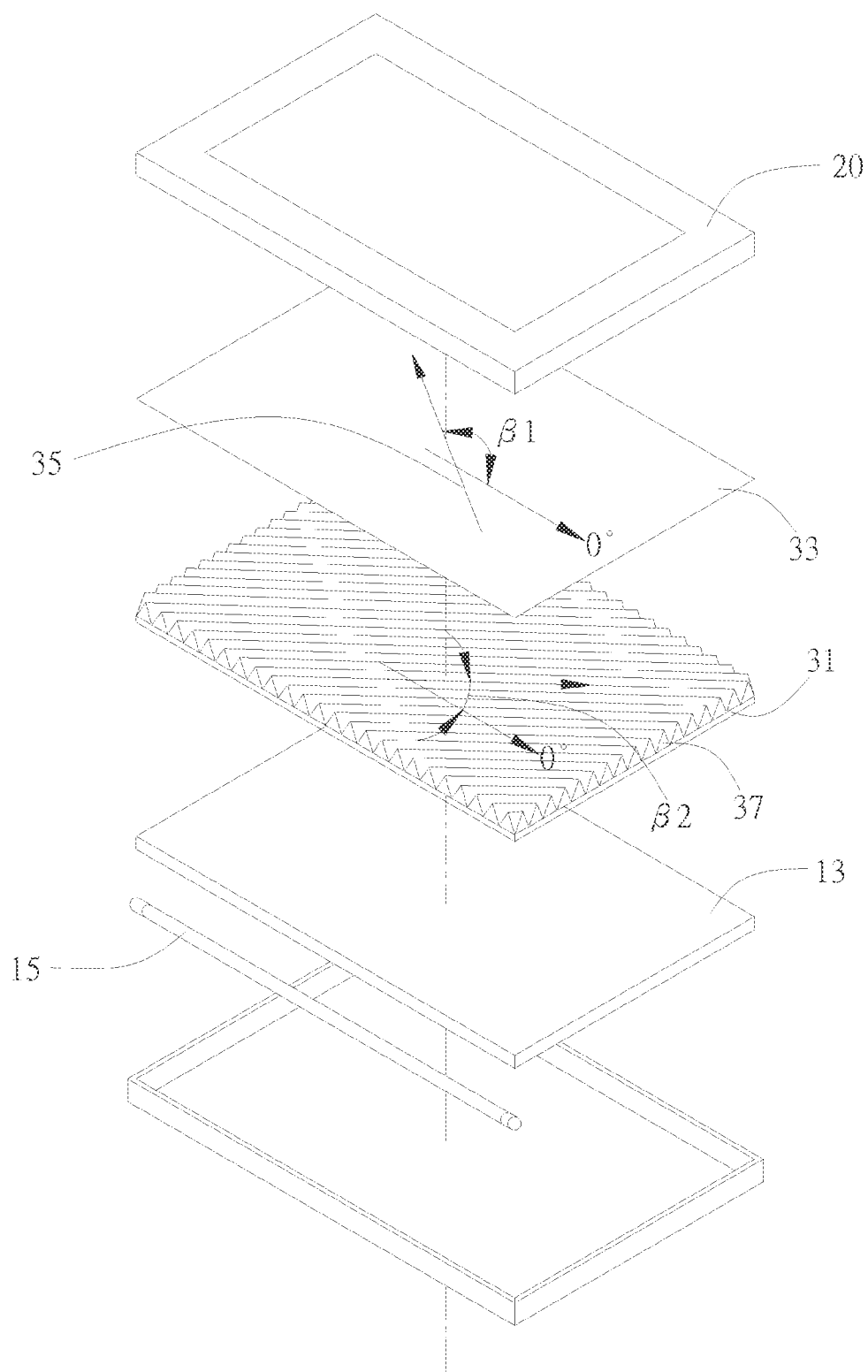
FIG. 1A schematically illustrates an exploded view of a conventional LCD device.
Figure 1B:
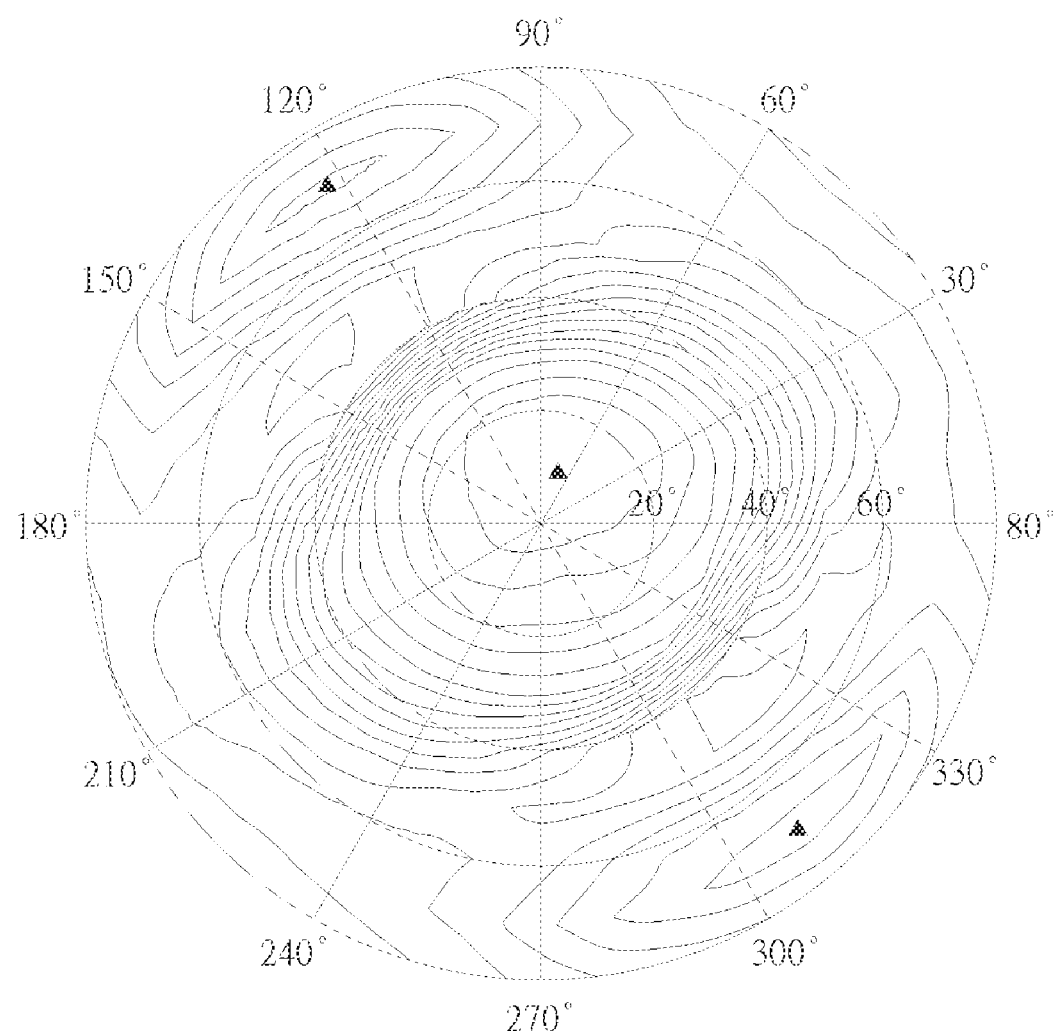
FIG. 1B schematically illustrates the brightness distribution of the conventional LCD device.
Figure 1C:
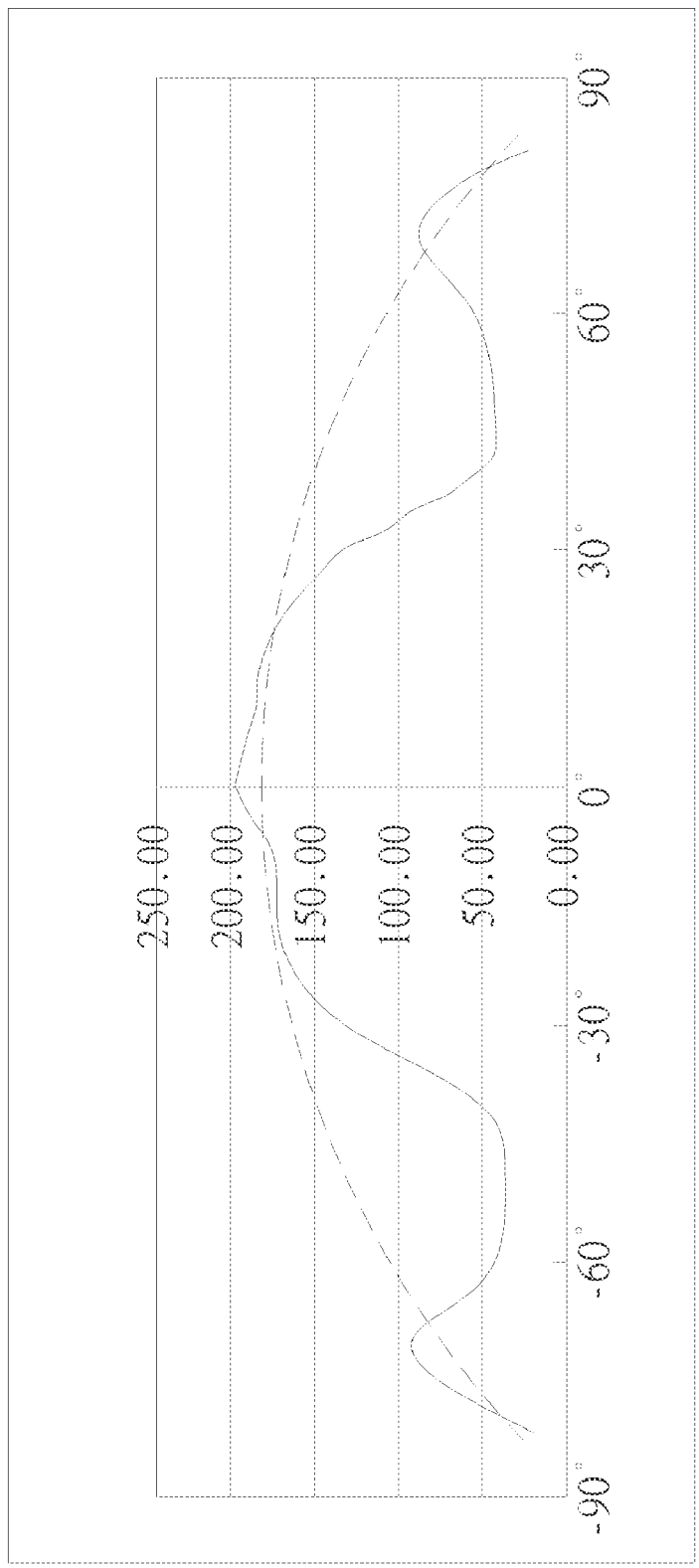
FIG. 1C schematically illustrates the brightness distribution of the conventional LCD device from the azimuth angle 120°-300°.
Figure 2:
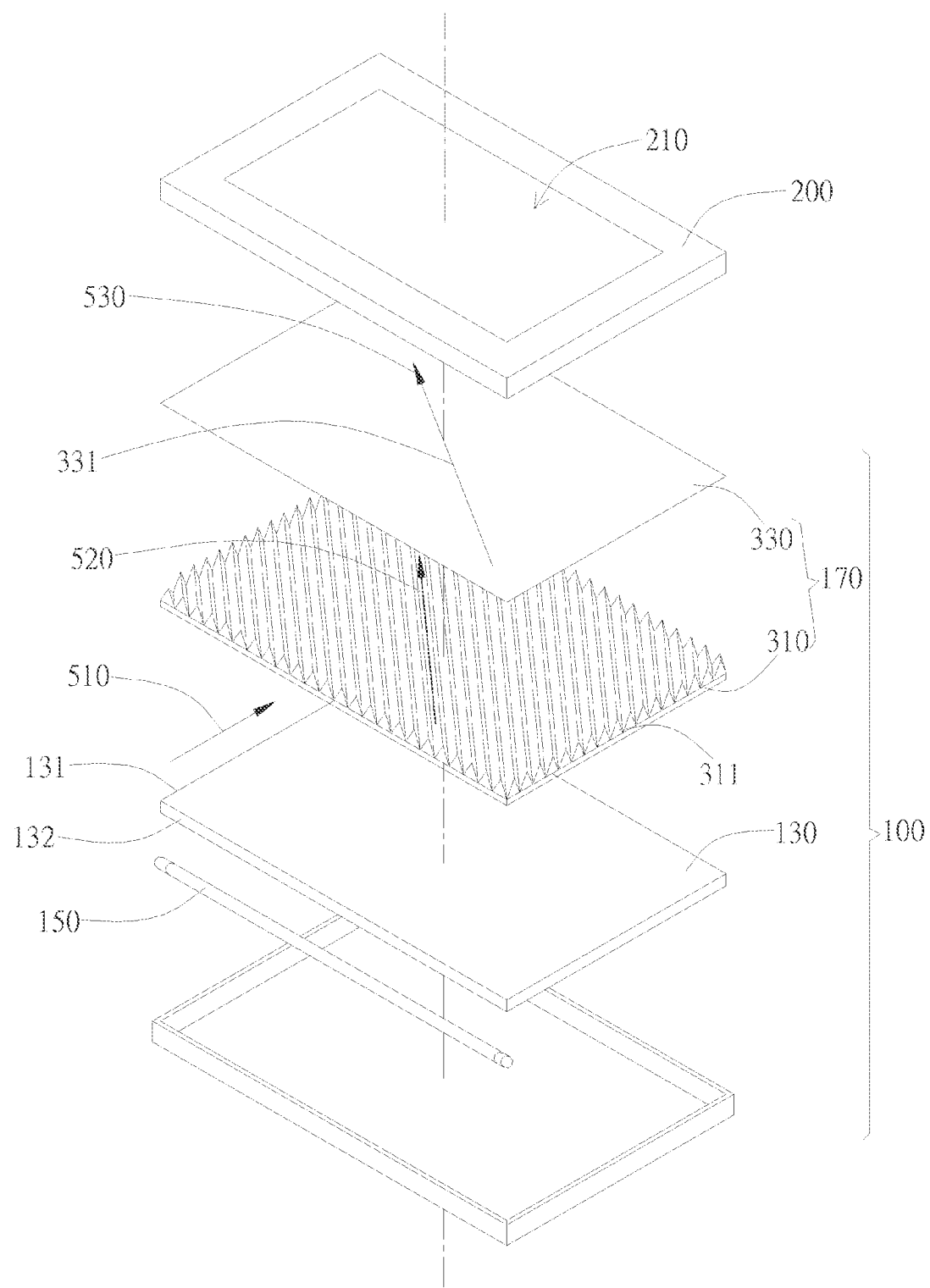
FIG. 2 schematically illustrates an exploded view of a first embodiment of the display device of this invention.

In the embodiment illustrated by FIG. 2, the display device includes a backlight module 100 and a display panel 200. The display panel 200 is disposed on the backlight module 100 with its back side corresponding to the light output side of the backlight module 100. Light output from the backlight module 100 enters the display panel 200 to facilitate the image display on the display surface 210 of the display panel 200.

As illustrated by FIG. 2, the backlight module 100 includes a light guide 130, a light source 150, and a plurality of optical films 170. The light guide 130 can be a rectangle or an irregular polygon having two adjacent edges, a first edge 131 and a second edge 132. The first edge 131 extends along a first direction 510, and the second edge 132 can be perpendicular to the first edge 131, or include a certain angle with the first edge 131, or joined with the first edge 131 through a sloping edge. In this embodiment, the first edge 131 is the shorter side of the rectangular light guide 130 and the second edge 132 is the longer side of the rectangular light guide 130; however, in other embodiments, a reversed configuration or other arrangements are possible. The light source 150 is disposed adjacent to the second edge 132 of the light guide 130 and preferably parallel to the second edge 132 of the light guide 130. The light source 150 disposed adjacent to the second edge 132 of the light guide 130 is not necessary to mean that the light source 150 is fixed on the light guide 130. The light source 150 can be fixed on the system housing or other circuit boards to be separated from the second edge 132 of the light guide 130 by a proper distance, as long as the light emitting part of the light source 150 faces the second edge 132 of the light guide 130.

In an embodiment, the light source 150 is a tube lamp extending along the second edge 132; however, in other embodiments, the light source 150 can be a plurality of light emitting diodes (LEDs) arranged in line or interlaced to form a light bar, so that the LEDs are distributed along the second edge 132. The light source 150 emits light toward the light guide 130, and the light is emitted into the light guide 130 from the second edge 132 of the light guide 130 along the first direction 510. After the light of the light source 150 enters the light guide 130, the light is transmitted and distributed across the light guide 130 through internal optical reflection and refraction effects. Then, the light is outputted to the optical films 170 from the light output surface or the upper surface of the light guide 130 as shown in FIG. 2.

Figure 3A:
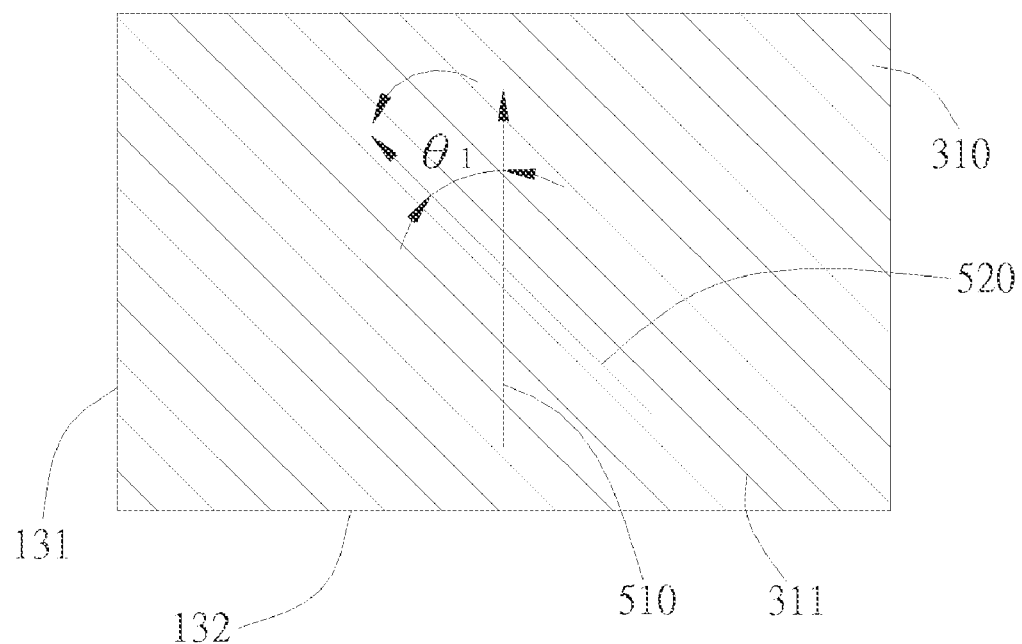
FIG. 3A illustrates the disposing direction of the BEF shown in FIG. 2.
Figure 10:
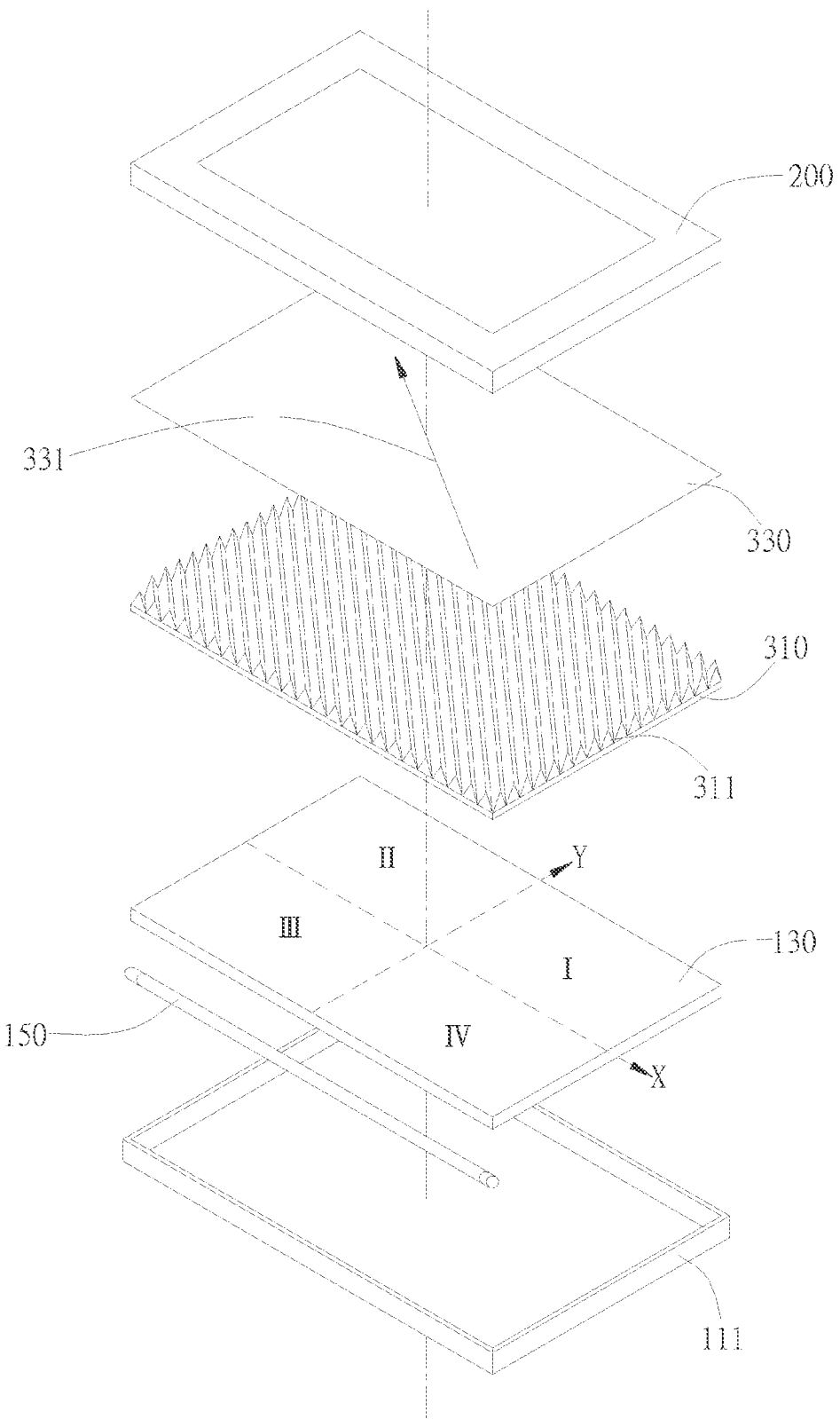
FIG. 10 is a schematic exploded view of the display device of this invention.

In the embodiment illustrated by FIG. 2, the optical films 170 include a first brightness enhancement film (BEF) 310 and a dual brightness enhancement film (DBEF) 330. The first BEF 310 is disposed on the light guide 130, and a plurality of prisms 311 is disposed thereon in parallel. The prisms 311 can be transparent triangular prisms horizontally disposed on the body of the first BEF 310; however, in other embodiments, the prism 311 can be trapezoidal lens or lens with other cross-sections. With the disposition of prisms 311, the first BEF 310 can recycle large angle incident light from the light guide 130 to increase the utilization rate of the light. As illustrated by FIG. 3A, the disposing direction of the prisms 311 extends along a second direction 520, and the second direction 520 is obtained by rotating counterclockwise a first angle θ1 with respect to the first direction 510. The first angle θ1 can range from 0° to 90°; in other words, if the second edge 132 of the light guide 130 is defined as X axis and the first edge 131 of the light guide 130 is defined as Y axis, the disposing direction of the prisms 311 has a negative slope and extends along the direction passing the second quadrant and the fourth quadrant, as illustrated by FIG. 10. However, in the preferred embodiment, the range of the first angle θ1 can be further limited between 34° and 67° according to product design experience or experimental experience.

Figure 3B:
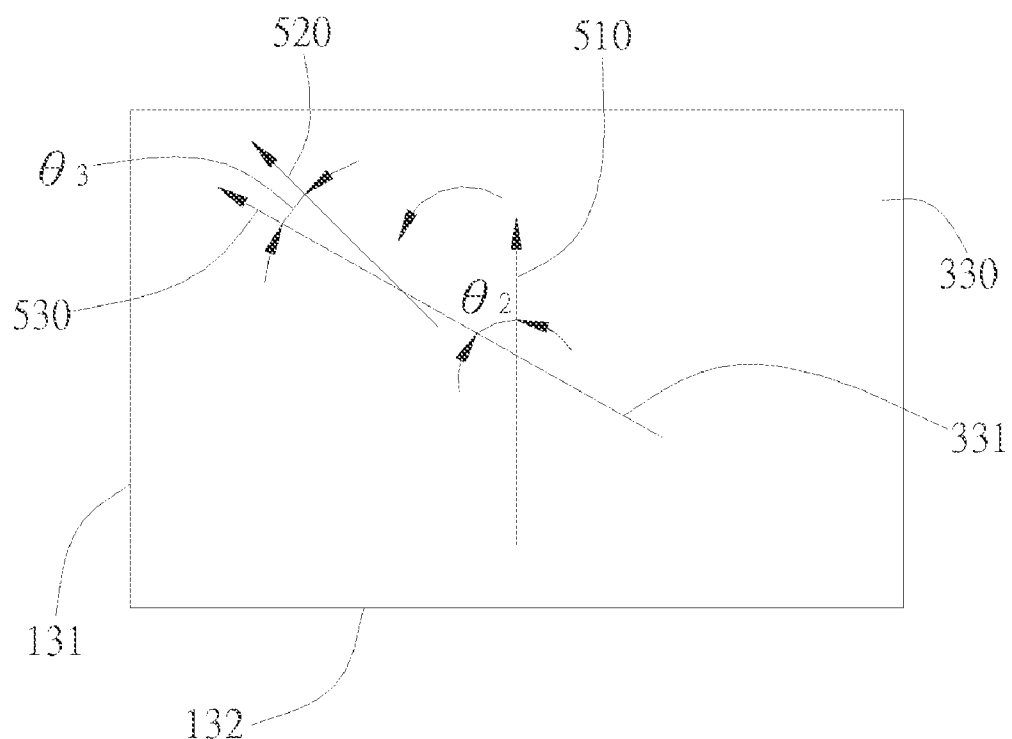
FIG. 3B illustrates the disposing direction of the DBEF shown in FIG. 2.

As illustrated by FIG. 2, the DBEF 330 is disposed on the first BEF 310 and has a transmission axis 331. With the design of the transmission axis 331, the DBEF 330 allows the polarization light in the direction of the transmission axis 331 to pass through and reflects the polarization light not in the direction of the transmission axis 331 back to the first BEF 310 and the light guide 130 for further use. As illustrated by FIG. 3B, the transmission axis 331 extends along a third direction 530 and the third direction 530 is obtained by rotating counterclockwise a second angle θ2 with respect to the first direction 510. The second angle θ2 usually ranges from 40° to 50°; in other words, if the second edge 132 of the light guide 130 is the X axis and the first edge 131 of the light guide is the Y axis, the direction of the transmission axis 331 has a negative slope and extends along the direction passing the second quadrant and the fourth quadrant, as illustrated by FIG. 10. However, in a preferred embodiment, the range of the second angle θ2 can be further limited between 43° and 47°, especially 45° for the optimal optical performance by parallel to the transmittance axis of lower polarizer. Moreover, an angle θ3 included between the second direction 520 and the third direction 530 can range from 0° to 42°.

Figure 4A:
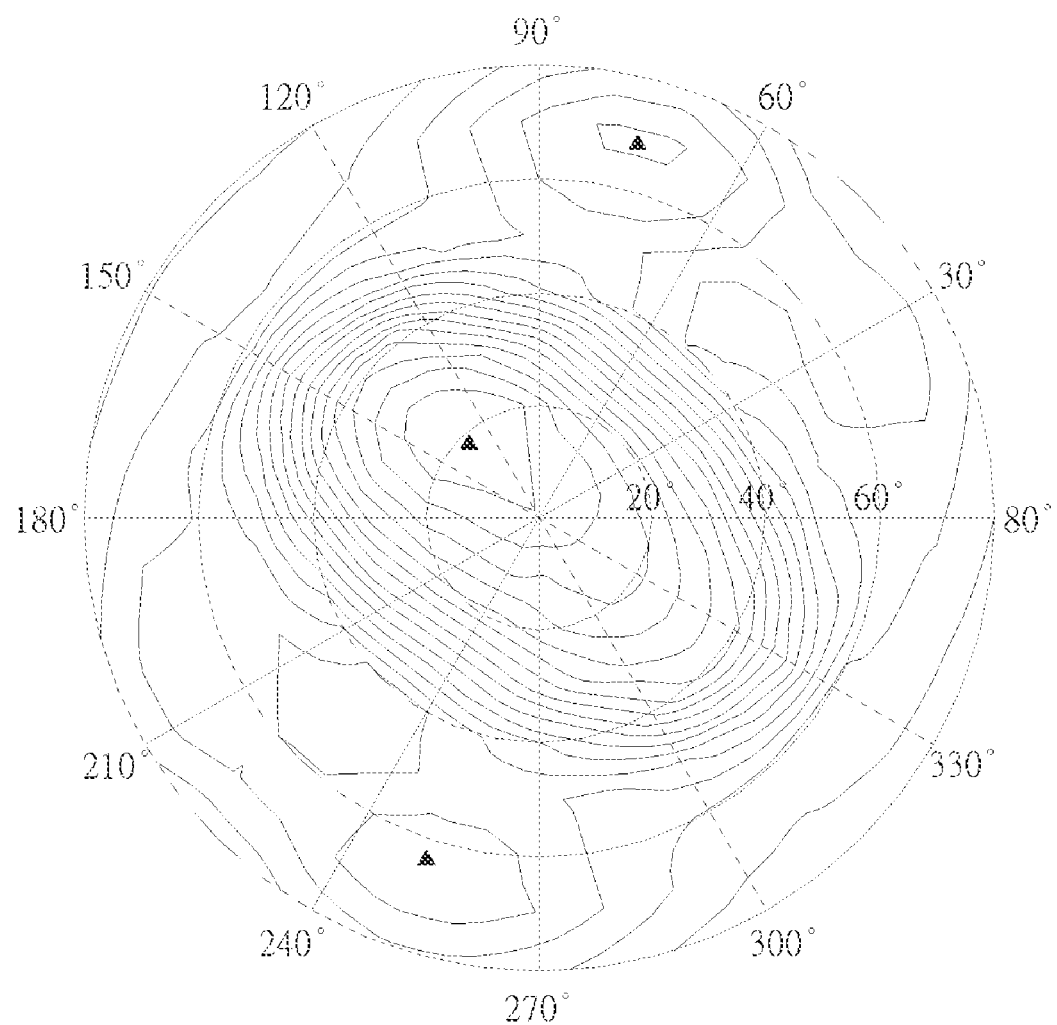
FIG. 4A schematically illustrates the brightness distribution of the display device shown in FIG. 2.
Figure 4B:
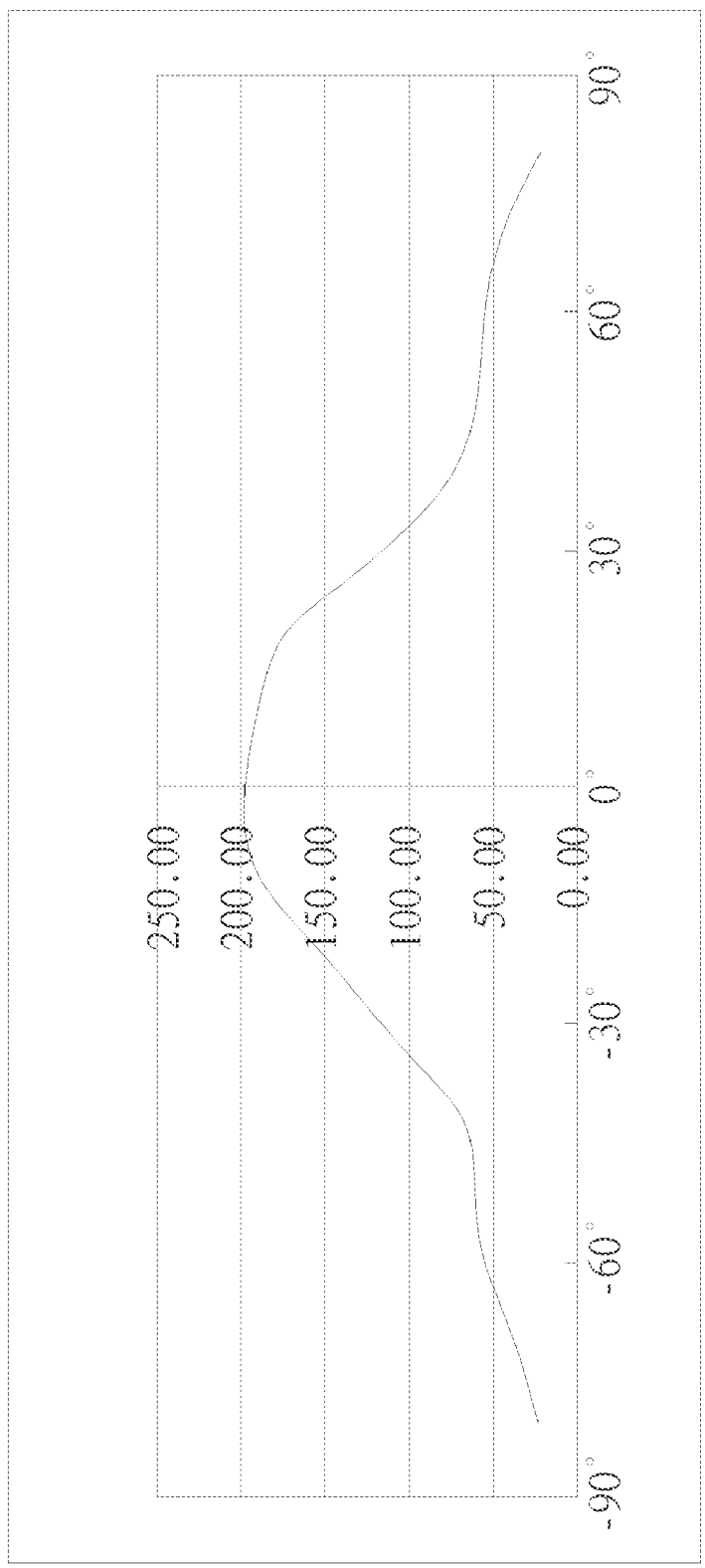
FIGS. 4B and 4C schematically illustrates the brightness distribution of the display device from the azimuth angle 60°-240°.
Figure 4C:
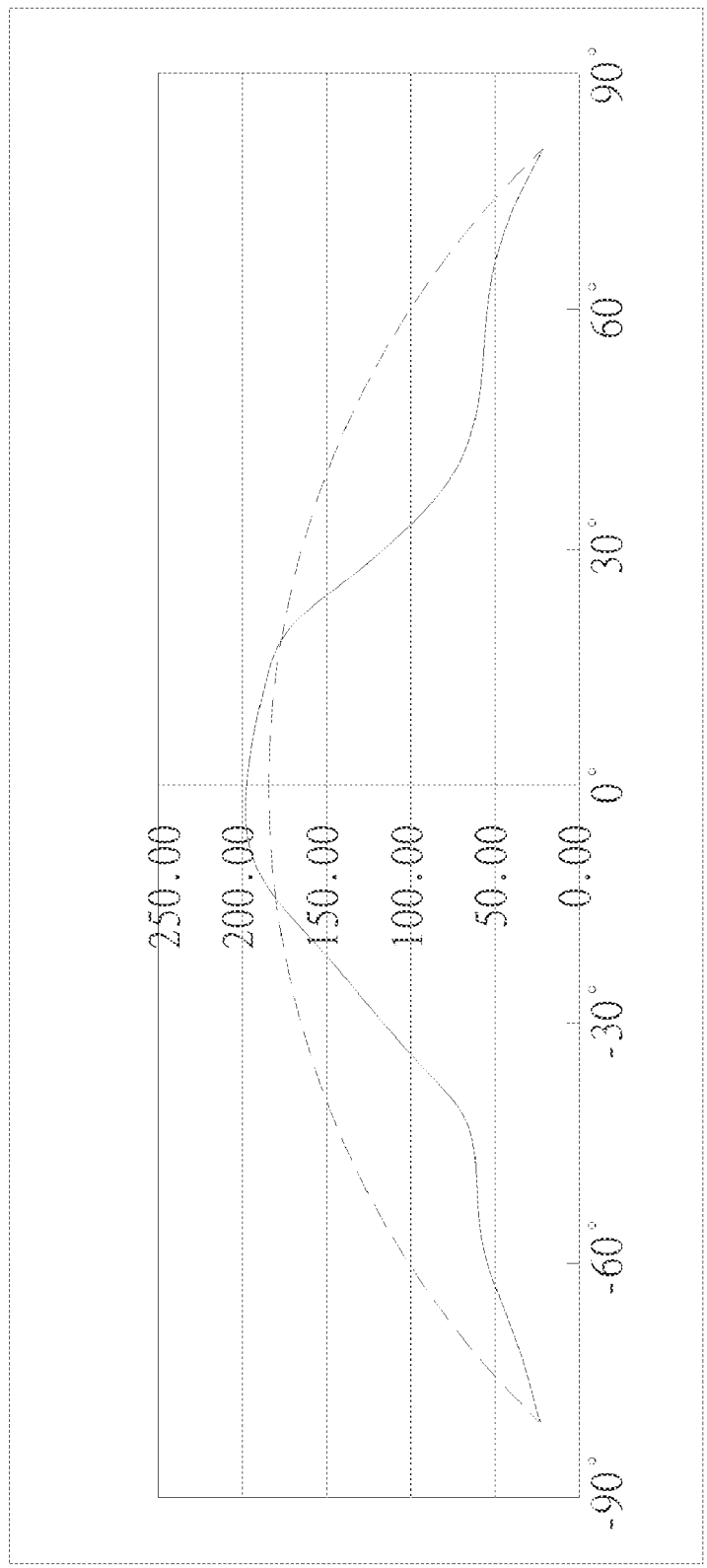

By arranging the disposing direction of the prisms 311 on the first BEF 310 and the direction of the transmission axis 331 of the DBEF 330 as described above, the brightness increment effect at larger viewing angle will be reduced. As illustrated by FIG. 4A, when observing from a viewing angle larger than 60° (e.g. the outmost circle area), the brightness increment effect has been significantly reduced and inhibited at the azimuth angle 60°-240°. As illustrated by FIG. 4B, take the brightness distribution curve of the azimuth angle 60°-240°; it can be found that the brightness peak value at viewing angle larger than 60° is significantly lower than that of the conventional backlight module. Because the brightness peak value at larger viewing angle is reduced, the overall distribution curve approximates to that of the scratched part which is illustrated by the dotted line shown in FIG. 4C. Therefore, the overall optical performance of the scratched part is closer to that of the unscratched part, such that the existence of scratches is less likely to be noticed by users.

Figure 5A:
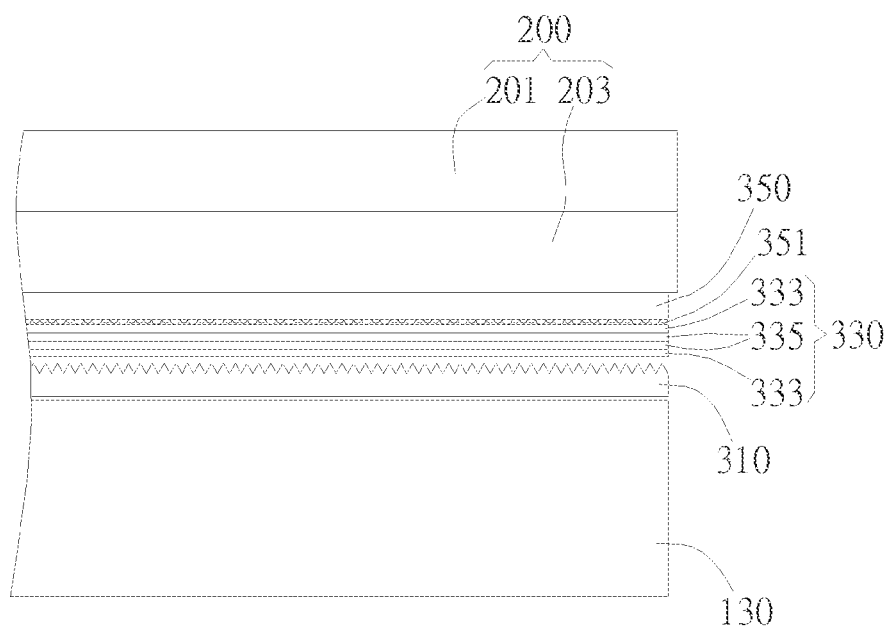
FIG. 5A is a schematic cross-sectional view of a second embodiment of the display device of this invention.

In the embodiment illustrated by FIG. 5A, the display device includes a lower polarization film 350 disposed on the DBEF 330. The lower polarization film 350 can be disposed at the bottom of the lower substrate 203 of the display panel 200 to polarize the light output from the backlight module 100, please refer to FIG. 2. The lower polarization film 35 has a polarization axis. The lower polarization film 35 is disposed in a manner that the transmission axis 331 of DBEF 330 can be nearly parallel to the polarization axis or the polarization axis can be nearly parallel to the transmission axis 331 of the DBEF 330. As illustrated by FIG. 5A, the lower polarization film 350 may further have a plurality of protrusions 351 on a side which faces the DBEF 330. The protrusions 351 are in contact with the surface of the DBEF 330, and the hardness of the protrusions 351 is harder than that of the surface of the DBEF 330.

As illustrated by FIG. 5A, the DBEF 330 preferably has two surface layers 333 and a plurality of optical layers 335. The surface layers 333 usually have smoother surface and can have a certain extent of matte design in accordance with the design needs. The optical layers 335 are sandwiched between the surface layers 333 and protected by the surface layers 333. Take the pencil test as an example; the hardness of the surface layer 333 approximates to 4 B, and the hardness of the protrusions 351 of the lower polarization film 350 approximates to 3 H. Therefore, when the protrusions 351 and the surface layers 333 come into contact, the surface layer 33 is likely to be scratched. However, by arranging the disposing direction of the prisms 311 of the first BEF 310 and the direction of the transmission axis 331 of the DBEF 330, the possibility of noticing the existence of scratches at larger viewing angle can be reduced.

Figure 5B:
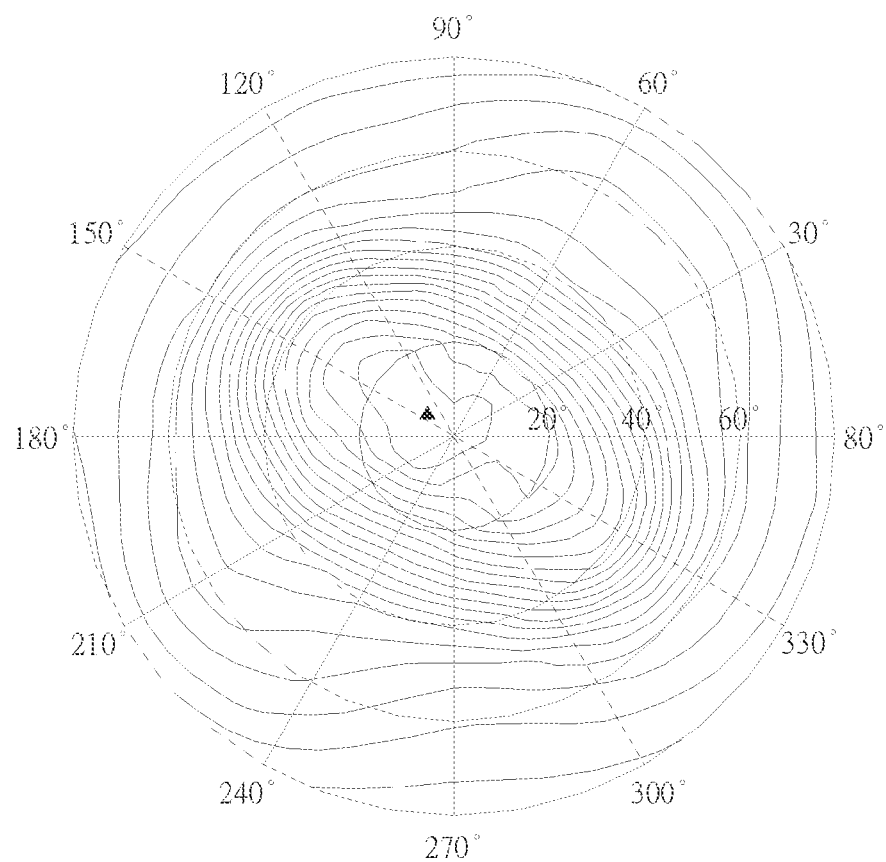
FIG. 5B is a schematic view of the brightness distribution of the display device shown in FIG. 5A.
Figure 5C:
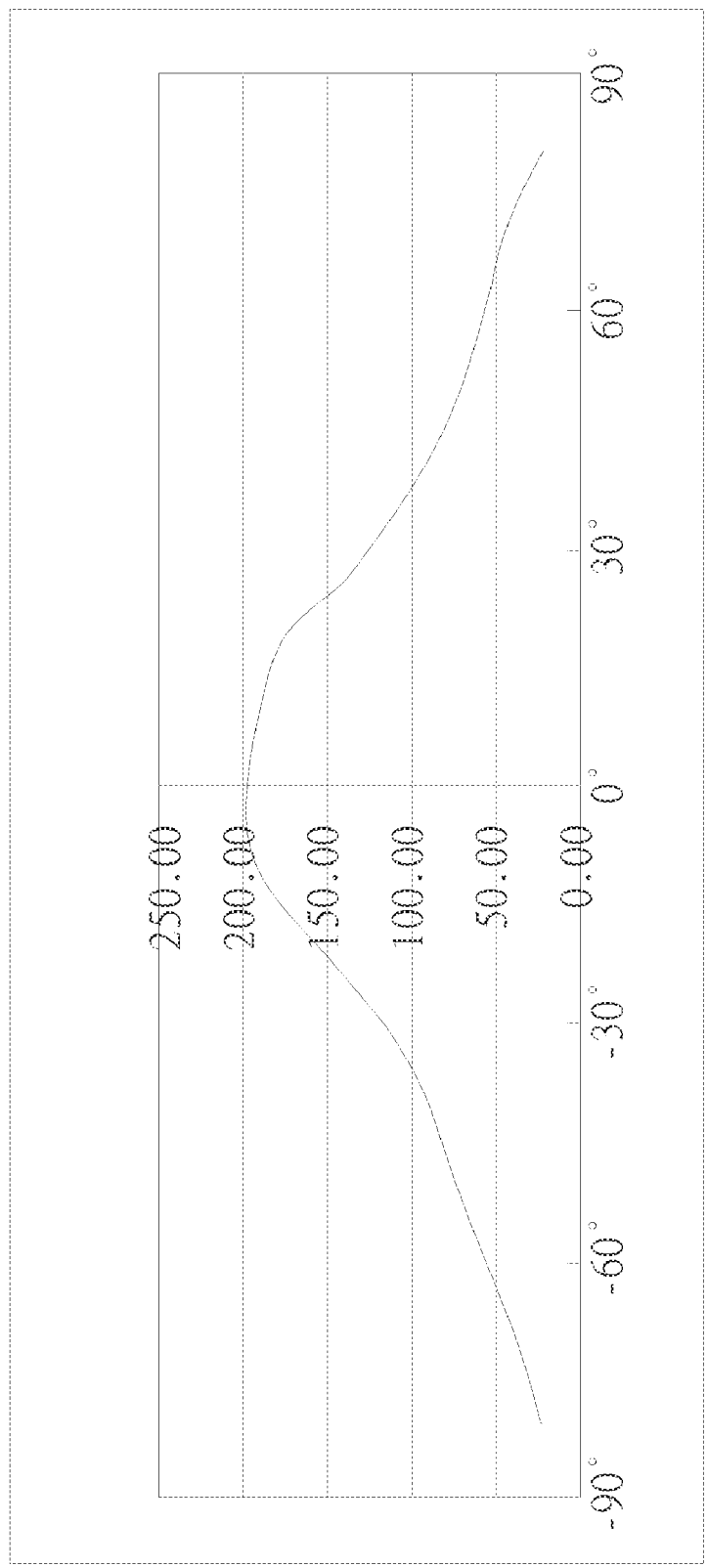
FIG. 5C is a schematic view of the brightness distribution of the display device from the azimuth angle 60°-240°.

Employing the lower polarization film 350 can further change the optical properties of the display device. As illustrated by FIG. 5B, when viewing from a viewing angle larger than 60° (e.g. the outmost circle area), the brightness increment effect has almost been eliminated at the azimuth angle 60°-240°. As illustrated by FIG. 5C, obtaining the brightness curve at the azimuth angle 60°-240°, it can be found that the brightness peak value at larger viewing angle between 60° and 90° has been alleviated, such that the scratches are less likely to be noticed at larger viewing angle.

Figure 6:
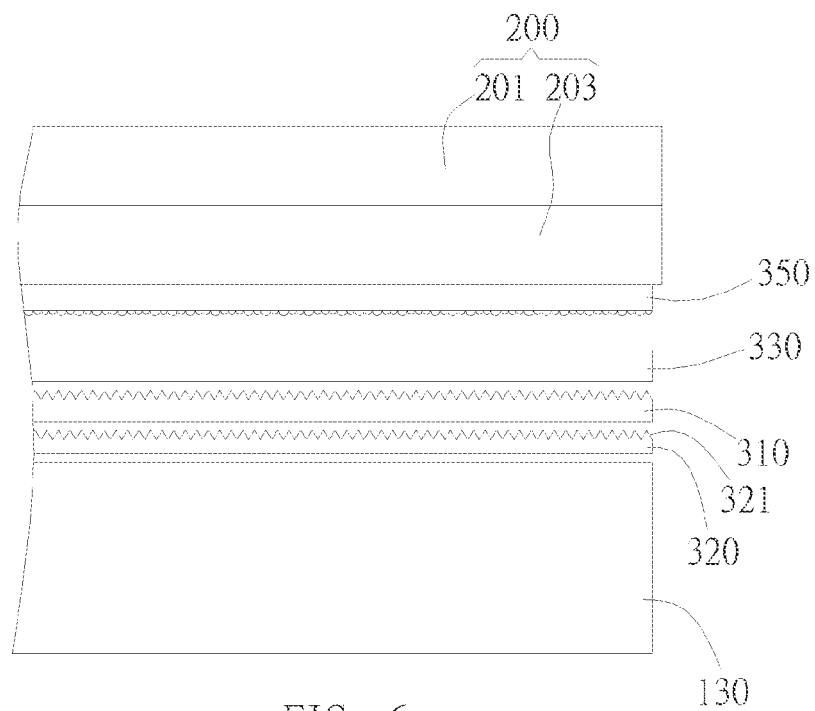
FIG. 6 is a schematic cross-sectional view of a third embodiment of the display device of this invention.

In the embodiment illustrated by FIG. 6, the display device as shown in FIG. 2 may further include a second BEF 320. The second BEF 320 is disposed between the first BEF 310 and the light guide 130. In the preferred embodiment, a plurality of prisms 321 are parallelly arranged on the second BEF 320. The prisms 321 can be transparent triangular prisms and horizontally disposed on the body of the second BEF 320; however, in other embodiments, the prism 321 can be a trapezoidal lens or a lens with other cross-section shapes. With the disposition of the prisms 321, the second BEF 320 can recycle large angle incident light from the light guide 130 to increase the utilization rate of light. The disposing direction of the prisms 321 on the second BEF 320 can be perpendicular to that of the prisms on the first BEF 310 to correspond to incident light from different directions. The direction of the first BEF 310 was supposed to be perpendicular to that of the second BEF 320. However, in FIG. 6, the directions of the first BEF 310 and the second BEF 320 are illustrated to be parallel for the purpose of better illustrating that the first BEF 310 also has prisms.

Figure 7:
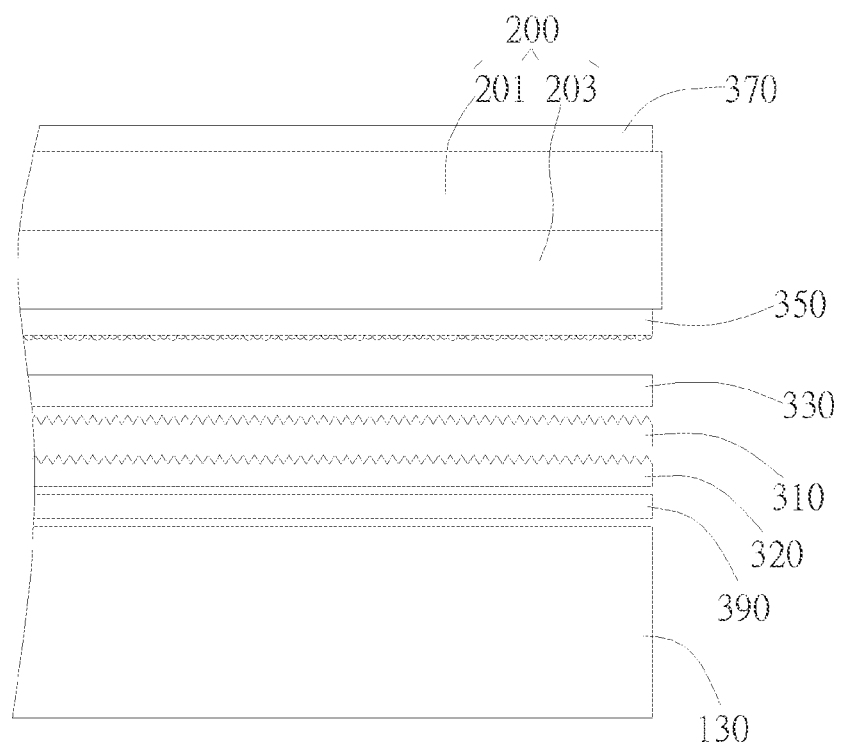
FIG. 7 is a schematic cross-sectional view of a fourth embodiment of the display device of this invention.

In the embodiment illustrated by FIG. 7, the display device as shown in FIG. 2 may further include an upper polarization film 370 and a diffusion film 390. The upper polarization film 370 is disposed on the upper substrate 201 of the display panel 200; in other words, the display panel 200 is sandwiched between the upper polarization film 370 and the lower polarization film 350. The diffusion film 390 can be disposed between the light guide 130 and the first BEF 310 or the second BEF 320. As illustrated by FIG. 7, the diffusion film 390 can be disposed on the light guide 130 and located beneath the second BEF 320. However, in other embodiments, the diffusion films 390 can be disposed without the second BEF 320.

Figure 8A:
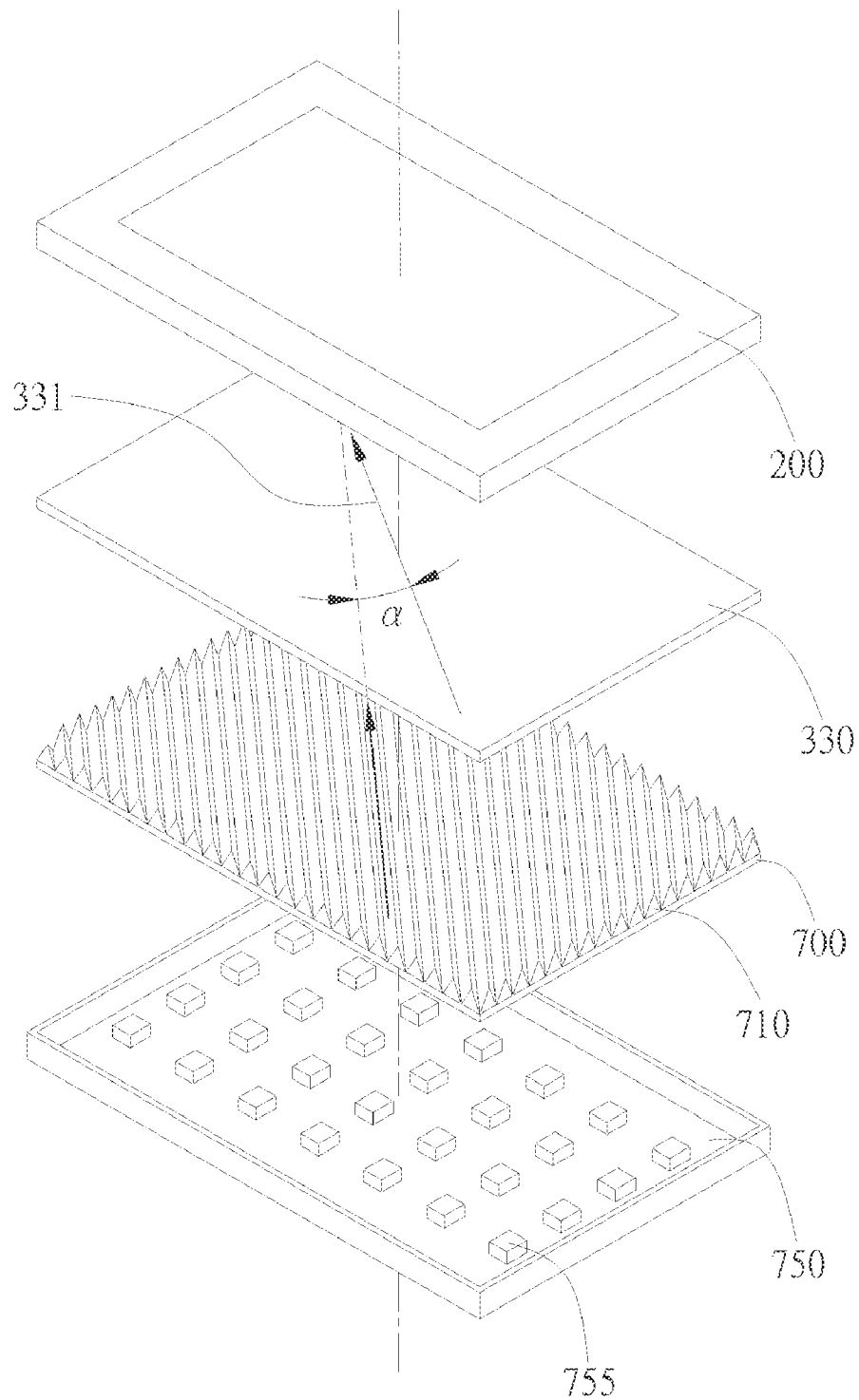
FIG. 8A schematically illustrates an exploded view of a fifth embodiment of the display device of this invention.
Figure 8B:
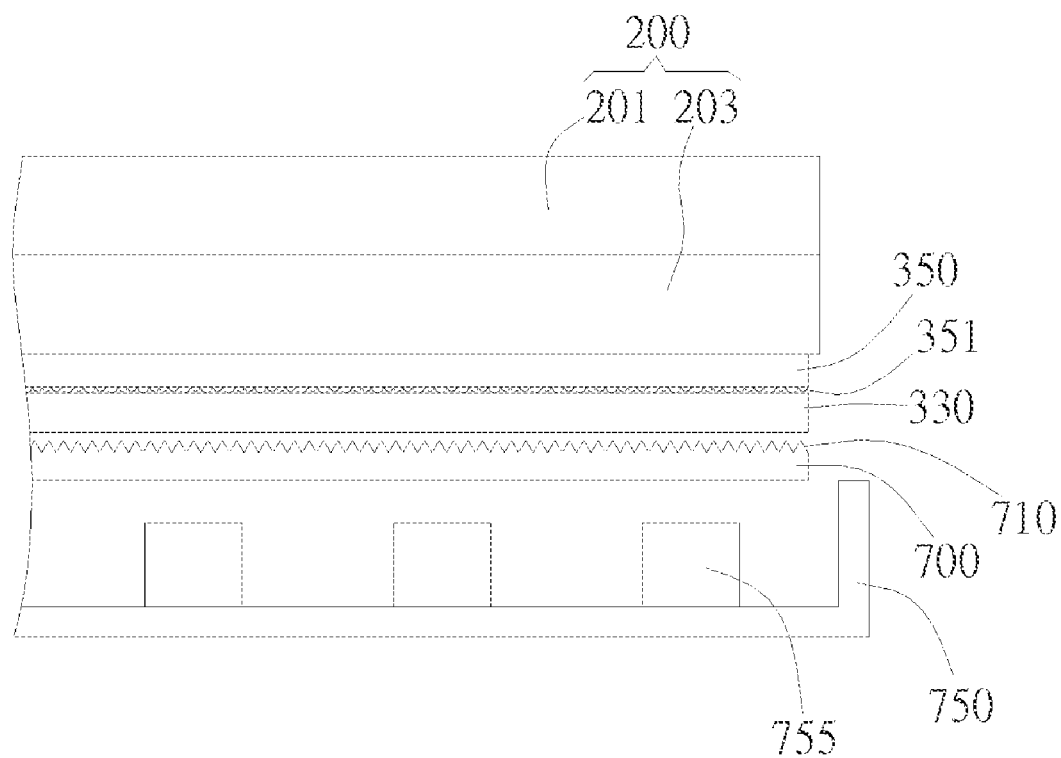
FIG. 8B is a schematic cross-sectional view of the display device shown in FIG. 8A.

FIG. 8A and FIG. 8B illustrate another embodiment of the display device. As illustrated by FIG. 8A and FIG. 8B, the display device includes a BEF 700, a DBEF 330, a lower polarization film 350, and a display panel 200. A plurality of prisms 710 is parallelly disposed on the BEF 700. The prism 710 can be a transparent triangular prism, and a distance between the center axes of two prisms can range from 40 μm to 50 μm and an angle of the cross section of an apex can be 90°; however, in other embodiments, the prism 710 can be a trapezoidal lens or a lens with other shapes. The DBEF 330 is disposed on the BEF 700 and has a transmission axis 331. With the design of transmission axis 331, the DBEF 330 can allow the polarization light in the direction of transmission axis 331 to pass through and reflect the polarization light not in the direction of the transmission axis 331 back to the backlight module for recycle. An angle α is included between the disposing direction of the prisms and the transmission axis 331, and the included angle α ranges from 0° to 42°. However, in other embodiments, the included angle α can be further limited between 11° and 22°.

As illustrated by FIG. 8B, the lower polarization film 350 is disposed on the DBEF 330, and the display panel 200 is disposed on the lower polarization film 350. In the preferred embodiment, the lower polarization film 350 is formed on the bottom of the lower substrate 203 of the display panel 200 and corresponds to the DBEF 330. The lower polarization film 350 has a polarization axis, and the polarization axis can be parallel to the transmission axis 331 of the DBEF 330. A plurality of protrusions 351 are provided on a side of the lower polarization film 350 that faces the DBEF 330. The protrusions 351 are in contact with the surface of the DBEF 330, and the hardness of the protrusions is higher than that of the surface of the DBEF 330. Moreover, in this embodiment, the display device includes a direct type backlight source 750 consisting of light emitting diodes 755; however, in other embodiments, the direct type backlight source or an edge type backlight source consisting of light tubes can be employed.

Figure 9:
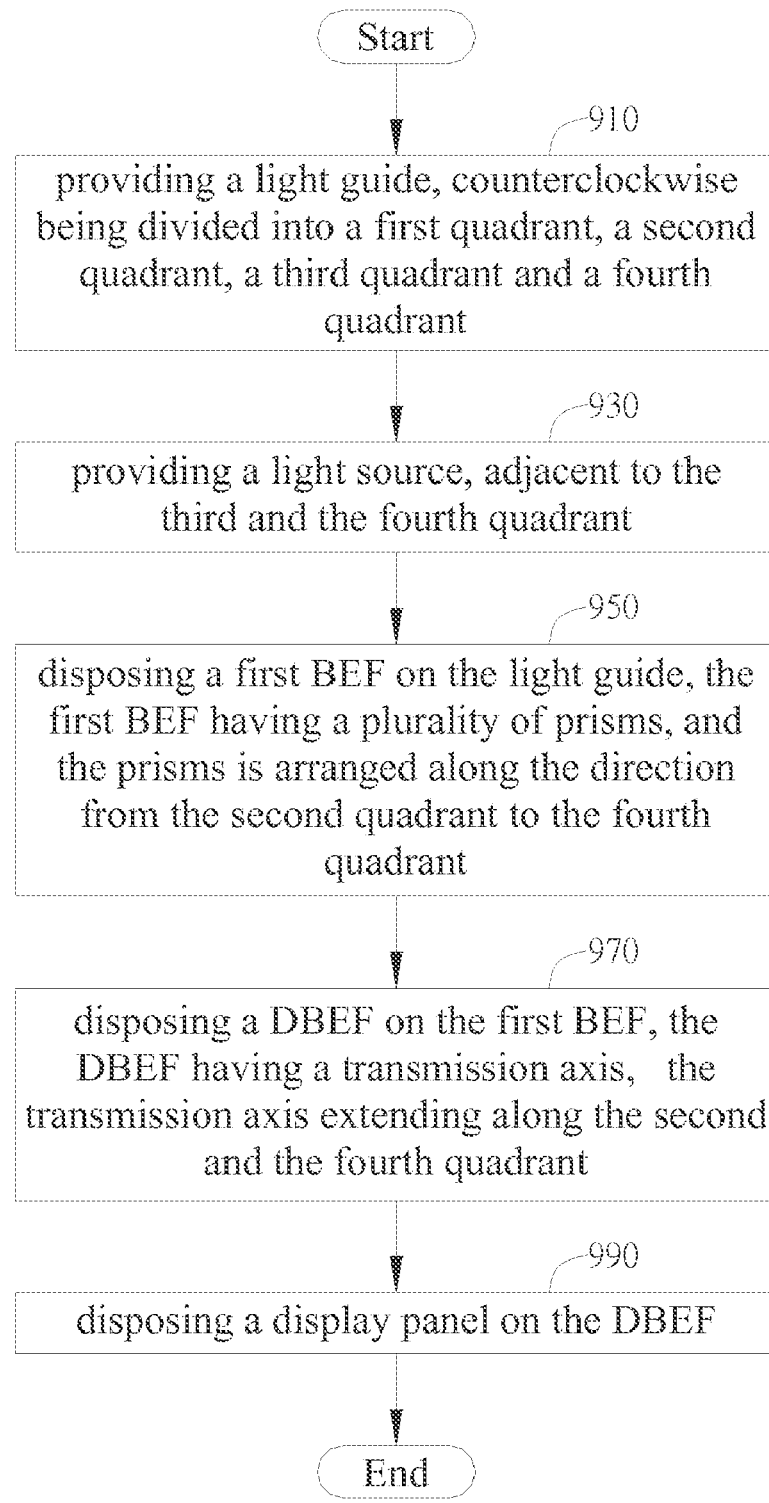
FIG. 9 is a flow chart of the manufacturing method of the display device of this invention.

FIG. 9 is a flow chart of a manufacturing method of the display device of this invention. Step 910 includes providing a light guide. As illustrated by FIG. 10, the light guide can be sequentially divided counterclockwise into a first quadrant I, a second quadrant II, a third quadrant III, and a fourth quadrant IV. From FIG. 10, the right hand side of the longer side of the light guide 130 is considered as the positive direction of X axis; and the remote end of the short side is considered as the positive direction of Y axis. The upper right part is the first quadrant I, the upper left part is the second quadrant II, the lower left part is the third quadrant III, and the lower right part is the fourth quadrant IV. The first quadrant I, the second quadrant II, the third quadrant III, and the fourth quadrant IV represent areas on the light guide 130, but do not mean that there is a physical division or separation structure.

Step 930 includes providing a light source 150 adjacent to the third quadrant III and the fourth quadrant IV. As illustrated by FIG. 10, the light source 150 is disposed corresponding to the lower end of the light guide 130 and parallel to the X axis direction. Therefore, one end of the light source 150 corresponds to the third quadrant III, and the other end corresponds to the fourth quadrant IV. The light source 150 above is illustrated adjacent to the third quadrant III and the fourth quadrant IV of the light guide 130, but the light source 150 is not limited to be fixed on the light guide 130. The light source 150 can be fixed on the system housing or other circuit board and kept a proper distance away from the edge of the light guide 130, as long as the light source 150 emits light toward the third quadrant III and the fourth quadrant IV of the light guide 130.

Step 950 includes disposing a first BEF 310 on the light guide 130. As illustrated by FIG. 10, the first BEF 310 has a plurality of prisms 311, and the prisms 311 extend along the direction passing the second quadrant II and the fourth quadrant IV. In other words, the slope of the prisms 311 in this coordination is negative. Step 970 includes disposing a DBEF 330 on the light guide 130. As illustrated by FIG. 10, the DBEF 330 has a transmission axis 331, and the transmission axis 331 extends along the direction passing the second quadrant II and the fourth quadrant IV. In other words, the slope of the transmission axis 331 in this coordination is negative. In other embodiments, the step can further limit the included angle α between the transmission axis 331 and the disposing direction of the prisms 331 to a range from 0° to 42°.

Step 990 includes disposing a display panel 200 on the DBEF 330. By arranging the prisms 311 of the first BEF 310 and the transmission axis 331 of the DBEF 330, the possibility of the scratches being noticed at large viewing angle can be reduced. Moreover, in other embodiments, a second BEF 320 can be disposed between the first BEF 310 and the light guide 130, as illustrated by FIG. 6 or FIG. 7. A lower polarization film 350 can be further disposed between the DBEF 330 and the display panel 200, as illustrated by FIG. 5A, FIG. 6, FIG. 7, or FIG. 8B. With the disposition of different optical films, the optical properties can be adjusted to meet the product requirements.

This invention has been described with the embodiments above; however, the embodiments above are only exemplary. What needs to point out is the disclosed embodiments do not limit the scope of this invention. Contrastly, the modifications and equivalents included in the spirit and the scope of the claims are all included in the scope of this invention.

What is claimed is:

1. A display device, comprising:
   a light guide having a first edge extending along a first direction and a second edge adjacent to the first edge;
   a light source, arranged adjacent to the second edge, being capable of emitting light along the first direction into the second edge;
   a first brightness enhancement film (BEF), disposed on the light guide, the first BEF having a plurality of prisms along a second direction, the second direction rotating counterclockwise a first angle with respect to the first direction, and the first angle ranging from 0° to 90°; and
   a dual brightness enhancement film (DBEF), disposed on the first BEF, the DBEF having a transmission axis extending along a third direction, the third direction rotating counterclockwise a second angle with respect to the first direction, and the second angle ranging from 40° to 50°; and
   a display panel, disposed on the DBEF.

2. The display device of claim 1, wherein the second direction and the third direction include an angle ranging from 0° and 42°.

3. The display device of claim 1, wherein the light source includes a tube lamp and the tube lamp extends along the second edge.

4. The display device of claim 1, wherein the light source includes a plurality of light emitting diodes (LEDs) and the LEDs are arranged along the second edge.

5. The display device of claim 1, further comprising a lower polarization film disposed on the DBEF, wherein the lower polarization film has a plurality of protrusions.

6. The display device of claim 5, wherein the protrusions are in contact with a surface of the DBEF.

7. The display device of claim 5, wherein the hardness of the protrusions is higher than the hardness of the surface of the DBEF.

8. The display device of claim 5, further comprising an upper polarization film, disposed on the display panel, wherein the display panel is sandwiched between the upper polarization film and the lower polarization film.

9. The display device of claim 1, further comprising a second BEF disposed between the first BEF and the light guide.

10. The display device of claim 1, further comprising a diffusion film disposed between the first BEF and the light guide.

11. The display device of claim 1, wherein the first angle ranges from 34° and 67°.

12. The display device of claim 11, wherein the second angle ranges from 43° and 47°.

13. The display device of claim 1, wherein the DBEF further comprises a plurality of optical layers and two surface layers, and the optical layers are sandwiched between the two surface layers.

14. A display device, comprising:
    a brightness enhancement film (BEF) having a plurality of prisms; and
    a dual brightness enhancement film (DBEF), disposed on the BEF, the DBEF having a transmission axis, a disposing direction of the prisms and the transmission axis having an included angle ranging from 0° to 42°;

a lower polarization film, disposed on the DBEF, the lower polarization film having a plurality of protrusions, the protrusions being in contact with a surface of the DBEF, and the hardness of the protrusions being higher than that of the surface of the DBEF; and a display panel, disposed on the lower polarization film.

15. The display device of claim 14, wherein the included angle ranges from 11° and 22°.

16. The display device of claim 14, wherein the DBEF further includes a plurality of optical layers and two surface layers, and the optical layers are sandwiched between the two surface layers.

17. A manufacturing method of a display device, comprising the following steps:

provinding a light guide being sequentially divided counter-clockwise into a first quadrant, a second quadrant, a third quadrant, and a fourth quadrant;

providing a light source adjacent to the third quadrant and the fourth quadrant;

disposing a first brightness enhancement film (BEF) on the light guide, the first BEF having a plurality of prisms extending along the direction passing the second quadrant and the fourth quadrant; and disposing a dual brightness enhancement film (DBEF) on the first BEF, the DBEF having a transmission axis extending along the direction passing the second quadrant and the fourth quadrant; and disposing a display panel on the DBEF.

18. The manufacturing method of claim 17, wherein the step of disposing the DBEF includes disposing the prisms in a manner that a disposing direction of the prisms and the transmission axis include an angle ranging from 0° to 42°.

19. The manufacturing method of claim 17, further comprising disposing a second BEF between the first BEF and the light guide.

20. The manufacturing method of claim 17, further comprising disposing a lower polarization film between the DBEF and the display panel.

* * * * *